(12) United States Patent
Ishigami et al.

(10) Patent No.: US 9,764,410 B2
(45) Date of Patent: Sep. 19, 2017

(54) SUBMERGED ARC WELDING METHOD FOR STEEL PLATE

(71) Applicant: JFE STEEL CORPORATION, Tokyo (JP)

(72) Inventors: Atsushi Ishigami, Tokyo (JP); Naoya Hayakawa, Tokyo (JP); Koji Yano, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 14/360,794

(22) PCT Filed: Nov. 28, 2012

(86) PCT No.: PCT/JP2012/007611
§ 371 (c)(1),
(2) Date: May 27, 2014

(87) PCT Pub. No.: WO2013/080524
PCT Pub. Date: Jun. 6, 2013

(65) Prior Publication Data
US 2015/0306694 A1    Oct. 29, 2015

(30) Foreign Application Priority Data
Nov. 29, 2011 (JP) .................... 2011-260281

(51) Int. Cl.
*B23K 9/18* (2006.01)
*B23K 33/00* (2006.01)
(Continued)

(52) U.S. Cl.
CPC ............ *B23K 9/188* (2013.01); *B23K 9/23* (2013.01); *B23K 33/006* (2013.01); *B23K 2201/06* (2013.01); *B23K 2203/04* (2013.01)

(58) Field of Classification Search
CPC ........... B23K 9/184; B23K 9/188; B23K 9/23
See application file for complete search history.

(56) References Cited

U.S. PATENT DOCUMENTS 2,832,880 A * 4/1958 Duben ................... B23K 9/188
                                                                    219/137 R
3,704,358 A * 11/1972 Saito ....................... B23K 9/184
                                                                    219/126
(Continued)

FOREIGN PATENT DOCUMENTS

EP    2078582    7/2009
GB    815607    7/1959
(Continued)

OTHER PUBLICATIONS

English translation of JP2002-219571 (to Do).*
(Continued)

*Primary Examiner* — Tu B Hoang
*Assistant Examiner* — Erin McGrath
(74) *Attorney, Agent, or Firm* — RatnerPrestia

(57) ABSTRACT

The present invention provides a submerged arc welding method attempting to enhance toughness of a welded zone with low heat input and capable of achieving deep penetration and a sufficiently wide bead width in welding a thick material at a weld speed of 3 m/min or less. In the submerged arc welding method, a first electrode at the head in a welding direction has a wire diameter of 3.9 to 4.1 mm, two electrodes are arranged on both sides holding a weld line therebetween at the tail end in the welding direction, the wire tip positions of the two electrodes on a surface of the steel plate are arranged on the same line vertical to the weld line, and a distance W (mm) between each of the wire tip positions and the weld line is 5 to 20 mm.

4 Claims, 2 Drawing Sheets

(51) Int. Cl.
*B23K 9/23* (2006.01)
*B23K 101/06* (2006.01)
*B23K 103/04* (2006.01)

(56) References Cited

U.S. PATENT DOCUMENTS

| | | | | |
|---|---|---|---|---|
| 4,214,141 | A * | 7/1980 | Okuda | B23K 35/362 |
| | | | | 148/26 |
| 4,572,936 | A * | 2/1986 | Scholz | B23K 35/3053 |
| | | | | 219/137 R |
| 5,214,265 | A * | 5/1993 | Pollack | B23K 9/188 |
| | | | | 219/130.1 |
| 8,895,896 | B2 * | 11/2014 | O'Donnell | B23K 9/1043 |
| | | | | 219/130.1 |
| 9,018,563 | B2 * | 4/2015 | Yamazaki | B23K 9/092 |
| | | | | 219/130.01 |
| 2006/0037952 | A1 * | 2/2006 | Myers | B23K 9/093 |
| | | | | 219/130.51 |
| 2007/0158324 | A1 * | 7/2007 | O'Donnell | B23K 9/1068 |
| | | | | 219/137.71 |
| 2012/0043307 | A1 * | 2/2012 | Lennartsson | B23K 9/188 |
| | | | | 219/137 R |

FOREIGN PATENT DOCUMENTS

| | | |
|---|---|---|
| JP | 52-097344 | 8/1977 |
| JP | 06-285639 | 10/1994 |
| JP | 07-266047 | 10/1995 |
| JP | 08-229685 | 9/1996 |
| JP | 08-243754 | 9/1996 |
| JP | 8-257753 | 10/1996 |
| JP | 9-206934 | 8/1997 |
| JP | 10-109171 | 4/1998 |
| JP | 11-138266 | 5/1999 |
| JP | 2002-120068 | 4/2002 |
| JP | 2002-219571 | 8/2002 |
| JP | 2006272377 A * | 10/2006 |
| JP | 2007-260684 | 10/2007 |
| JP | 2009-195957 | 9/2009 |

OTHER PUBLICATIONS

English translation of JP2006-272377 (to Hayakawa et al.).*
Extended European search report, dated Jun. 15, 2015, in corresponding European Patent Application No. 12853232.2.
Chinese Office Action dated Mar. 10, 2016 in corresponding Chinese Patent Application No. 201280058067.X with concise statement of relevance of Chinese Office Action.
Korean Office Action of Feb. 16, 2016 in corresponding Korean Patent Application No. 2014-7014224 with concise statement of relevance of Korean Office Action.

* cited by examiner

[Fig.1]
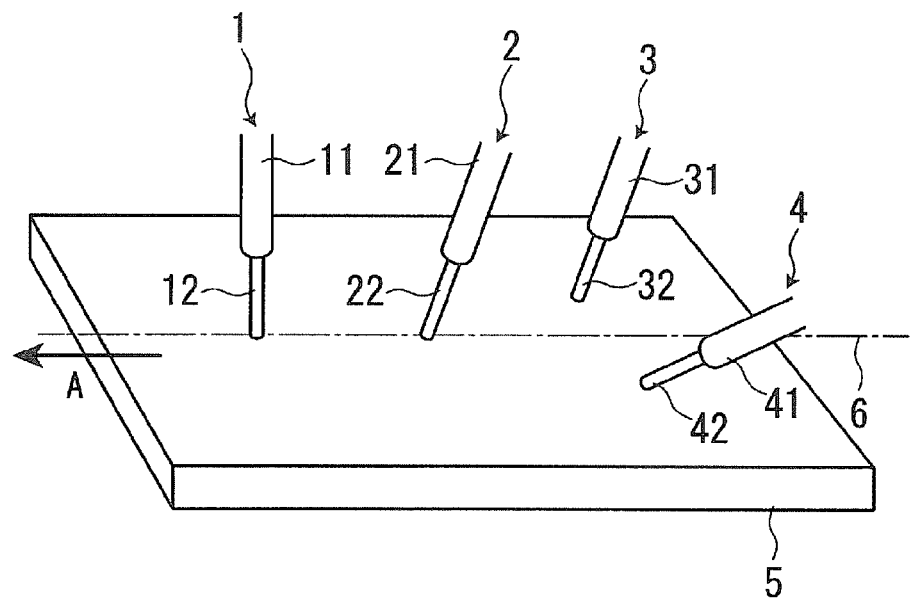
[Fig.2]
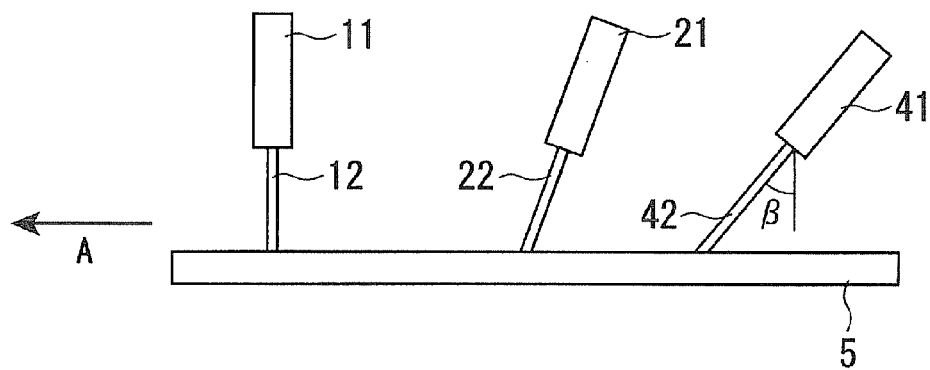
[Fig.3]
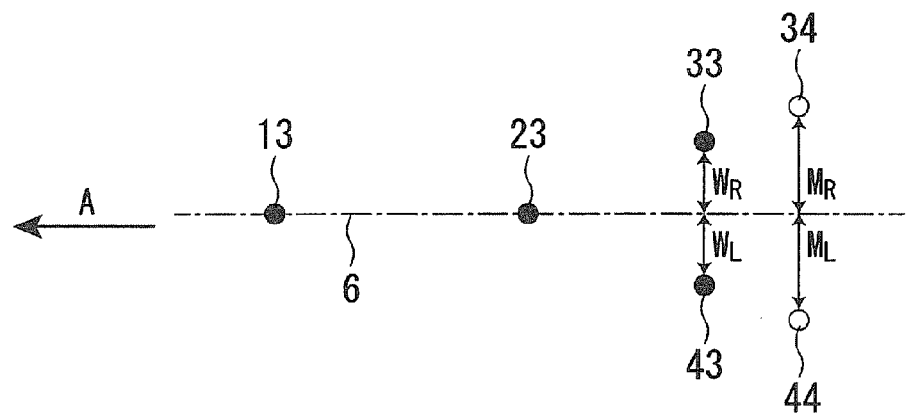

[Fig.4]
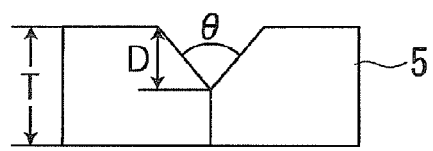
[Fig.5]
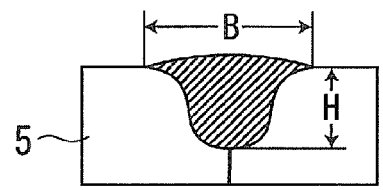
[Fig.6]
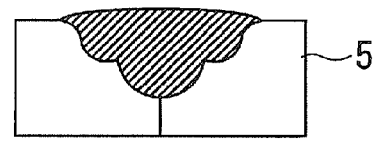
[Fig.7]
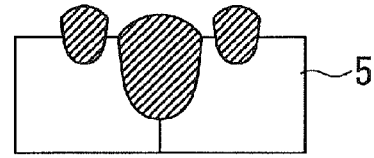

SUBMERGED ARC WELDING METHOD FOR STEEL PLATE

TECHNICAL FIELD

The present invention relates to submerged arc welding of steel plates and to submerged arc welding suitable for seam-welding large-diameter steel pipes such as UOE steel pipes, spiral steel pipes, and the like.

BACKGROUND ART

Submerged arc welding (for example, refer to Patent Literatures 1 and 2) using two or more electrodes is popularized as seam welding of large-diameter steel pipes such as UOE steel pipes, spiral steel pipes, and the like, and double one layer welding with high efficiency in which the inner side is welded in one pass and the external side is welded in one pass is widely used in view of improvement of productivity of large-diameter steel pipes.

In double one layer welding, it has the need to secure a depth of penetration for sufficiently overlapping an internal weld metal with an external weld metal so as not to produce an unmelted part, and thus welding is generally performed by supplying a large current of 1000 A or more.

On the other hand, seam welding of large-diameter steel pipes has the problem of deterioration in toughness of welded zones, particularly welded heat affected zones, and thus has the need to decrease welding heat input as much as possible in order to improve toughness of welded zones. However, a decrease in welding heat input increases the possibility of producing lack of penetration, easily produces an unmelted part, and causes the problem of easily producing surface defects such as undercut and the like.

Therefore, a welding technique is researched for both securing a depth of penetration and improving toughness of welded zones, and achieving a wide bead width and preventing surface defects such as undercut in seam welding of large-diameter steel pipes.

For example, Patent Literature 3 discloses a welding method including combination of gas metal arc welding and submerged arc welding, in which a deep depth of penetration is secured by gas metal arc welding, and then submerged arc welding with a large amount of metal deposit is performed by using two wires for one torch for the submerged arc welding, the two wires being arranged at a right angle with a weld line direction, thereby achieving a wide bead width to prevent surface defects such as undercut and the like.

However, the technique disclosed in Patent Literature 3 can exhibit the effect of widening a bead width at a weld speed exceeding 3 m/min, but at a weld speed of 3 m/min or less, the effect of widening a bead width cannot be obtained particularly in welding of a thick material having a thickness of over 20 mm. Therefore, the bead width is required to be widened by a method of increasing a welding voltage or the like, resulting in the problem of difficult in decreasing welding heat input. Further, combination of gas metal arc welding and submerged arc welding complicates an apparatus configuration and thus increases a load required for control of welding conditions and for maintenance of an apparatus.

Patent Literature 4 discloses a submerged arc welding method for high-speed welding with multiple electrodes, in which a magnetic field is applied to an unsolidified weld metal to control molten iron flow, thereby attempting to prevent surface defects such as undercut and the like.

However, the technique disclosed in Patent Literature 4 can exhibit the effect of widening a bead width but requires an apparatus introduced for applying a magnetic field and thus complicates an apparatus configuration and increases a load required for control of welding conditions and magnetic field setting conditions and for maintenance of an apparatus.

CITATION LIST

Patent Literature

PTL 1: Japanese Unexamined Patent Application Publication No. 11-138266
PTL 2: Japanese Unexamined Patent Application Publication No. 10-109171
PTL 3: Japanese Unexamined Patent Application Publication No. 7-266047
PTL 4: Japanese Unexamined Patent Application Publication No. 2002-120068

SUMMARY OF INVENTION

Technical Problem

An object of the present invention is to provide a submerged arc welding method attempting to enhance toughness of a welded zone with low heat input, and capable of achieving deep penetration and a sufficiently wide bead width in welding a thick material at a weld speed of 3 m/min or less.

Solution to Problem

As a result of examination of weld joints produced by using various electrode arrangements in submerged arc welding, the inventors found that when two electrodes are arranged on both sides holding a weld line therebetween at the tail end in a welding direction so as to be disposed on the same line vertical to the weld line, and the positions and angles of the tail-end electrodes are defined, an attempt can be made to enhance toughness of a welded zone with low heat input, and sufficient penetration and a weld joint having a wide bead width can be achieved.

The present invention has been achieved on the basis of the above-described finding and has a gist below.

(1) A submerged arc welding method for a steel plate using three or more electrodes, wherein a first electrode at the head in a welding direction has a wire diameter of 3.9 to 4.1 mm, two electrodes are arranged on both sides holding a weld line therebetween at the tail end in the welding direction, the wire tip positions of the two electrodes on a surface of the steel plate are arranged on the same line vertical to the weld line, and a distance W (mm) between each of the wire tip positions and the weld line is 5 to 20 mm.

(2) The submerged arc welding method described above in (1), wherein a distance M (mm) between the weld line and a position of intersection of the surface of the steel plate and a vertical line drawn vertically downward from a tip center of a contact tip of each of the two tail-end electrodes satisfies M≥W with respect to the distance W.

(3) The submerged arc welding method described above in (1) or (2), wherein a direct current is supplied to the first electrode, and an alternating current is supplied to the second and subsequent electrodes.

Advantageous Effects of Invention

According to the present invention, it is possible to decrease welding heat input and secure both high toughness and a deep penetration depth of a welded zone. Further, a sufficiently wide bead width can be achieved in welding such a thick material as welded at a weld speed of 3 m/min or less. Therefore, the present invention is advantageous for submerged arc welding and exhibits a significant industrial effect.

BRIEF DESCRIPTION OF DRAWINGS

FIG. 1 is a perspective view schematically showing an example of a submerged arc welding method of the present invention.

FIG. 2 is a side view of an electrode and a steel plate shown in FIG. 1.

FIG. 3 is a plan view showing a position of a wire tip of each electrode and a tip center position of a contact tip of each tail-end electrode on a surface of the steel plate shown in FIG. 1.

FIG. 4 is a sectional view schematically showing an example of a groove shape.

FIG. 5 is a sectional view schematically showing an example of a weld joint.

FIG. 6 is a sectional view schematically showing another example of a weld joint.

FIG. 7 is a sectional view schematically showing a further example of a weld joint.

DESCRIPTION OF EMBODIMENTS

FIG. 1 is a perspective view schematically showing an example in which a steel plate is welded by applying a submerged welding method of the present invention, and FIG. 2 is a side view of the example in FIG. 1. FIG. 3 is a plan view showing a position of a wire tip of each electrode and a tip center position of a contact tip of each tail-end electrode on a surface of the steel plate shown in FIG. 1. A submerged arc welding method of the present invention is described below with reference to FIGS. 1 to 3. FIGS. 1 to 3 show an example using four electrodes, but the present invention relates to a submerged arc welding method using three or more electrodes, and is not limited to use of four electrodes.

As shown in FIG. 1, when four electrodes are used, an electrode at the head in a welding direction shown by arrow A is referred to as a "first electrode 1", and a locus of a moving tip position of a wire 12 of the first electrode 1 on a surface of a steel plate 5 is referred to as a "weld line 6". An electrode second in the welding direction A is referred to as a "second electrode 2" and located behind the first electrode 1. Further, two tail-end electrodes are arranged on both sides holding the weld line 6 therebetween so as to be located behind the second electrode 2 and are referred to as a "third electrode 3" and a "fourth electrode 4", respectively. Contact tips 11, 21, 31, and 41 of the electrodes are provided with wires 12, 22, 32, and 42, respectively.

First, the first electrode is described.

When the wire 12 of the first electrode 1 has a wire diameter exceeding 4.1 mm, deep penetration cannot be obtained, and thus the wire diameter is 4.1 mm or less. With the wire diameter of less than 3.9 mm, as shown in FIG. 6, penetration separation easily occurs. Therefore, the wire 12 of the first electrode 1 has a wire diameter in a range of 3.9 to 4.1 mm.

A current supplied to the wire 12 of the first electrode 1 is preferably a direct current in order to further increase the depth of penetration.

Further, as shown in FIG. 2, the wire 12 of the first electrode 1 is preferably disposed within a range of 0° to −15° formed with the vertical to the surface of a steel plate 5 (minus: sweep-back angle). By disposing the wire 12 of the first electrode as described above, an arc can be supplied to the steel plate 5 in the vertical direction, and thus deep penetration can be achieved.

Next, the second electrode is described.

As shown in FIG. 3, the second electrode 2 is disposed so that the tip position 23 of the wire 22 on the surface of the steel plate is arranged on the weld line 6. The wire diameter of the wire 22 and the current density of a current supplied to the wire 22 are not particularly limited, but an alternating current is preferably applied to the wire 22 in order to prevent the occurrence of arc interference with the other electrodes.

Further, as shown in FIG. 2, the wire 22 of the second electrode 2 is preferably inclined so that the tip of the wire 22 is located ahead of (that is, the first electrode side) the contact tip 21 in the welding direction A. An angle β (referred to as an "angle of advance" hereinafter) formed by the wire 22 and a vertical line is preferably 5° or more because the effect of widening a bead width is significantly exhibited. The excessively large angle β of advance of the second electrode 2 causes unstable welding and easily produces slag inclusion, and thus the angle β of advance is preferably 20° or less.

When the present invention is applied by using three electrodes, the second electrode 2 is not disposed, but two tail-end electrodes are arranged on both sides of the weld line 6 so as to be located behind the first electrode 1.

Also, when the present invention is applied by using five or more electrodes, the third and subsequent electrodes are disposed behind the second electrode 2 on the weld line 6, and two tail-end electrodes are disposed on both sides of the weld line 6.

Next, the tail-end electrodes are described.

As shown in FIG. 3, the third electrode 3 and the fourth electrode 4 at the tail end are disposed so that the tip positions 33 and 43 of the wires 32 and 42 on the surface of the steel plate are arranged on the same line vertical to the weld line 6. When a distance $W_R$ between the tip position 33 of the wire 32 of the third electrode 3 and the weld line 6 and a distance $W_L$ between the tip position 43 of the wire 42 of the fourth electrode 4 and the weld line 6 are less than 5 mm, the effect of widening the bead width cannot be achieved. When the distance $W_R$ and distance $W_L$ exceed 20 mm, bead separation occurs in a weld metal of each of the third electrode 3 and the fourth electrode 4 as shown in FIG. 7, thereby failing to prevent surface defects such as undercut and the like. Therefore, both the distance $W_R$ and distance $W_L$ are within a range of 5 to 20 mm. The distance $W_R$ and distance $W_L$ need not necessarily be the same, but in order to form a bead with a good shape and prevent undercut, it is preferred that $W_R=W_L$.

Further, as shown in FIG. 2, the wires 32 and 42 of the third electrode 3 and the fourth electrode 4, respectively, are preferably inclined so that the tips of the wires 32 and 42 are located ahead of (that is, the first electrode side) the contact tips 31 and 41, respectively, in the welding direction A. An angle β of advance of each of the wires 32 and 42 is preferably 20° or more because the effect of widening a bead width is significantly exhibited. The excessively large angle β of advance of each of the third electrode 3 and the fourth electrode 4 easily increases variation in the bead width, and thus the angle β of advance is preferably 50° or less.

Further, as shown in FIG. 3, the third electrode 3 and the fourth electrode 4 are disposed so that positions 34 and 44 (hereinafter, referred to as a "tip center position of the contact tip") of intersection of the surface of the steel plate 5 and vertical lines drown vertically downward from the tip centers of the contact tips 31 and 41 are arranged on the same line vertical to the weld line 6. When a distance $M_R$ (mm) between the weld line 6 and the tip center position 34 of the contact tip 31 of the third electrode 3 on the surface of the steel plate 5 and a distance $M_L$ (mm) between the weld line 6 and the center position 44 of the contact tip 41 of the fourth electrode 4 on the surface of the steel plate 5 satisfy $M_R<W_R$ and $M_L<W_L$, respectively, penetration of each of the third electrode 3 and the fourth electrode 4 is separated as shown in FIG. 6, and thus surface defects such as undercut cannot be prevented. The distance $M_R$ and distance $M_L$ need not necessarily be the same, but in order to form a bead with a good shape and prevent undercut, it is preferred that $M_R=M_L$.

The wires 32 and 42 of the third electrode 3 and the fourth electrode 4, respectively, need not necessarily have the same wire diameter, but in order to form a bead with a good shape and prevent undercut, the wires having the same wire diameter are preferably used.

Also, a current to be supplied to the wires 32 and 42 is preferably an alternating current in order to prevent the occurrence of arc interference between the electrodes. The voltage of each of the wires 32 and 42 is preferably within a range of 38 to 42 V because the effect of widening the bead width is significantly exhibited.

Although an example using the four electrodes is described above, the number of electrodes used in the present invention is not limited to 4, and the present invention can be applied to submerged arc welding using three or more electrodes. In particular, when 3 to 5 electrodes are used, a significant effect can be obtained. Use of 6 or more electrodes is undesired because of deterioration in toughness of a welded heat affected zone due to excessive welding heat input.

Herein, the term "vertical" does not necessary have a strict meaning, and a degree of freedom of about ±15° is permitted.

Also, the present invention can be applied to various plate thicknesses and groove shapes and to one-side welding and both-side welding at various weld speeds, and particularly in application to welding of a steel plate (thickness: over 20 mm) at a weld speed of 3 m/min or less, it is possible to achieve deep penetration and a wide bead width and decrease welding heat input, and thus the present invention is effective in improving toughness of a welded heat affected zone and preventing undercut.

EXAMPLES

After a groove having a groove angle θ of each of 60°, 70°, and 80° and a groove depth D of each of 8 mm, 10 mm, and 17 mm was formed in a steel plate 5 having a thickness T of each of 18.0 mm, 25.4 mm, and 38.1 mm as shown in FIG. 4, a weld joint shown in FIG. 5 was formed by submerged arc welding using four electrodes. Table 1 shows groove shapes, Table 2 shows welding conditions, Table 3 shows arrangements of electrodes, and Table 4 shows setting of welding currents.

TABLE 1

| Number | Thickness (mm) | Groove angle (°) | Groove depth (mm) |
|---|---|---|---|
| 1 | 25.4 | 70 | 10.0 |
| 2 | 38.1 | 60 | 17.0 |
| 3 | 25.4 | 70 | 10.0 |
| 4 | 25.4 | 70 | 10.0 |
| 5 | 25.4 | 70 | 10.0 |
| 6 | 38.1 | 60 | 17.0 |
| 7 | 25.4 | 70 | 10.0 |
| 8 | 25.4 | 70 | 10.0 |
| 9 | 25.4 | 70 | 10.0 |
| 10 | 18.0 | 80 | 8.0 |
| 11 | 18.0 | 80 | 8.0 |

TABLE 2

| Number | #1 Current (A) | #1 Voltage (V) | #1 Wire diameter (mm) | #2 Current (A) | #2 Voltage (V) | #2 Wire diameter (mm) | #3 Current (A) | #3 Voltage (V) | #3 Wire diameter (mm) | #4 Current (A) | #4 Voltage (V) | #4 Wire diameter (mm) | Speed (cm/min) | Heat input (kJ/mm) |
|---|---|---|---|---|---|---|---|---|---|---|---|---|---|---|
| 1 | 1250 | 33 | 4.0 | 1050 | 38 | 4.0 | 780 | 38 | 4.0 | 780 | 38 | 4.0 | 145 | 5.8 |
| 2 | 1350 | 33 | 4.0 | 1080 | 40 | 4.0 | 900 | 42 | 4.0 | 900 | 42 | 4.0 | 95 | 10.3 |
| 3 | 1250 | 33 | 4.0 | 1050 | 38 | 4.0 | 780 | 38 | 4.0 | 780 | 38 | 4.0 | 145 | 5.8 |
| 4 | 1250 | 33 | 4.0 | 1050 | 38 | 4.0 | 780 | 38 | 4.0 | 780 | 38 | 4.0 | 145 | 5.8 |
| 5 | 1250 | 33 | 4.0 | 1050 | 38 | 4.0 | 780 | 38 | 4.0 | 780 | 38 | 4.0 | 145 | 5.8 |
| 6 | 1350 | 33 | 4.0 | 1080 | 40 | 4.0 | 900 | 42 | 4.0 | 900 | 42 | 4.0 | 95 | 10.3 |
| 7 | 1250 | 33 | 3.2 | 1050 | 38 | 3.2 | 780 | 38 | 4.0 | 780 | 38 | 4.0 | 145 | 5.8 |
| 8 | 1250 | 33 | 4.8 | 1050 | 38 | 4.8 | 780 | 38 | 4.0 | 780 | 38 | 4.0 | 145 | 5.8 |
| 9 | 1250 | 33 | 4.0 | 1050 | 38 | 4.0 | 780 | 38 | 4.0 | 780 | 38 | 4.0 | 145 | 5.8 |
| 10 | 1150 | 35 | 4.0 | 920 | 38 | 4.0 | 640 | 40 | 4.0 | 640 | 40 | 4.0 | 200 | 3.8 |
| 11 | 1150 | 35 | 4.0 | 920 | 38 | 4.0 | 640 | 40 | 4.0 | 640 | 40 | 4.0 | 200 | 3.8 |

1 to #4 represent first electrode to fourth electrode, respectively.

TABLE 3

| Number | Distance between electrodes (mm) #1 to #2 | #2 to #3 | #3 to #4 | Distance between base metal and tip (mm) #1 | #2 | #3 | #4 | Electrode angle (°) #1 | #2 | #3 | #4 | Distance between weld line and wire W (mm) #1 | #2 | #3 | #4 | Distance between weld line and tip M (mm) #1 | #2 | #3 | #4 |
|---|---|---|---|---|---|---|---|---|---|---|---|---|---|---|---|---|---|---|---|
| 1 | 17 | 13 | 0 | 25 | 30 | 35 | 35 | 0 | 15 | 30 | 30 | 0 | 0 | −5 | 5 | 0 | 0 | −5 | 5 |
| 2 | 17 | 13 | 0 | 25 | 30 | 35 | 35 | 0 | 15 | 30 | 30 | 0 | 0 | −20 | 20 | 0 | 0 | −20 | 20 |
| 3 | 17 | 13 | 0 | 25 | 30 | 35 | 35 | 0 | 15 | 30 | 30 | 0 | 0 | −20 | 20 | 0 | 0 | −19 | 19 |
| 4 | 17 | 13 | 0 | 25 | 30 | 35 | 35 | 0 | 15 | 30 | 30 | 0 | 0 | −10 | 10 | 0 | 0 | −12 | 12 |
| 5 | 17 | 13 | 0 | 25 | 30 | 35 | 35 | 0 | 15 | 30 | 30 | 0 | 0 | −4 | 4 | 0 | 0 | −6 | 6 |
| 6 | 17 | 13 | 0 | 25 | 30 | 35 | 35 | 0 | 15 | 30 | 30 | 0 | 0 | −22 | 22 | 0 | 0 | −22 | 22 |
| 7 | 17 | 13 | 0 | 25 | 30 | 35 | 35 | 0 | 15 | 30 | 30 | 0 | 0 | −20 | 20 | 0 | 0 | −20 | 20 |
| 8 | 17 | 13 | 0 | 25 | 30 | 35 | 35 | 0 | 15 | 30 | 30 | 0 | 0 | −5 | 5 | 0 | 0 | −5 | 5 |
| 9 | 17 | 13 | 10 | 25 | 30 | 35 | 35 | 0 | 15 | 30 | 45 | 0 | 0 | 0 | 0 | 0 | 0 | 0 | 0 |
| 10 | 19 | 14 | 0 | 25 | 25 | 30 | 30 | 0 | 15 | 30 | 30 | 0 | 0 | −5 | 5 | 0 | 0 | −5 | 5 |
| 11 | 19 | 14 | 12 | 25 | 25 | 30 | 30 | 0 | 15 | 30 | 45 | 0 | 0 | 0 | 0 | 0 | 0 | 0 | 0 |

1 to #4 represent first electrode to fourth electrode, respectively.
A distance between electrodes represents a distance along a weld line.
A positive electrode angle represents an angle of advance, and a negative electrode angle represents a sweep-back angle.
A positive distance from a weld line represents a distance on the left side in a welding direction and a negative distance represents a distance on the right side.
A distance between a weld line and a wire represents a distance from a weld line to a wire tip measured in a surface layer of a steel plate.
A distance between a weld line and a tip represents a distance from a weld line to a tip center position of a contact tip measured in a surface layer of a steel plate.

TABLE 4

| | Type of power supply | | | |
|---|---|---|---|---|
| Number | #1 | #2 | #3 | #4 |
| 1 | DC | AC | AC | AC |
| 2 | DC | AC | AC | AC |
| 3 | DC | AC | AC | AC |
| 4 | AC | AC | AC | AC |
| 5 | DC | AC | AC | AC |
| 6 | DC | AC | AC | AC |
| 7 | DC | AC | AC | AC |
| 8 | DC | AC | AC | AC |
| 9 | DC | AC | AC | AC |
| 10 | DC | AC | AC | AC |
| 11 | DC | AC | AC | AC |

The bead appearances of the resultant weld joints were visually observed, and further sections of bead constant regions were observed to measure depth of penetration H (mm) and bead width B (mm). The results are shown in Table 5.

TABLE 5

| Number | Depth of penetration (mm) | Bead width (mm) | Bead appearance and penetration separation | Remarks |
|---|---|---|---|---|
| 1 | 17.8 | 36.2 | Beautiful | Invention Example |
| 2 | 22.8 | 42.3 | Beautiful | Invention Example |
| 3 | 17.5 | 36.7 | Penetration separation | Invention Example |
| 4 | 16.2 | 36.5 | Beautiful | Invention Example |
| 5 | 17.9 | 33.1 | Beautiful | Comparative Example |
| 6 | 22.5 | 46.1 | Bead separation | Comparative Example |
| 7 | 18.4 | 44.4 | Bead separation | Comparative Example |
| 8 | 15.4 | 36.4 | Beautiful | Comparative Example |
| 9 | 17.7 | 33.0 | Beautiful | Comparative Example |
| 10 | 15.1 | 29.1 | Beautiful | Invention Example |
| 11 | 14.9 | 26.8 | Beautiful | Comparative Example |

As shown in Table 5, in an invention example according to the present invention, a depth of penetration was secured, and a wide bead width is more increased than usual. In particular, in Numbers 1, 2, and 10, a beautiful bead appearance was obtained. In Number 5 of a comparative example, the distance between the weld line and the wire tip position of each of the two tail-end electrodes is 4 mm, and thus the bead width was narrow. In Number 6, the distance W between the weld line and the wire tip position of each of the two tail-end electrodes was 22 mm, and thus bead separation occurred as shown in FIG. 7. In Number 7, the wire diameter of the first electrode was 3.2 mm, and thus separation of bead occurred as shown in FIG. 7. In Number 8, the wire diameter of the first electrode was 4.8 mm, and thus penetration was small. In Numbers 9 and 11, the distance W between the weld line and the wire tip position of each of the two tail-end electrodes was 0 mm, and thus the bead width was narrow.

REFERENCE SIGNS LIST

1 first electrode
11 contact tip of first electrode
12 wire of first electrode
13 tip position of wire of first electrode
2 second electrode
21 contact tip of second electrode
22 wire of second electrode
23 tip position of wire of second electrode
3 third electrode
31 contact tip of third electrode
32 wire of third electrode
33 tip position of wire of third electrode
34 tip center position of contact tip of third electrode
4 fourth electrode
41 contact tip of fourth electrode
42 wire of fourth electrode
43 tip position of wire of fourth electrode
44 tip center position of contact tip of fourth electrode
5 steel plate
6 weld line

The invention claimed is:
1. A submerged arc welding method for a steel plate using four or more electrodes, comprising the steps of:
   providing the steel plate with a surface having a weld line that separates the steel plate into a first area and an opposite, second area;
   placing a tip of a wire of a first electrode having a wire diameter of 3.9 to 4.1 mm on the surface of the steel plate at a head first position of the weld line, wherein a direct current is supplied to the first electrode, and moving the first electrode in a welding direction along the weld line, the wire of the first electrode being disposed with respect to a line vertical to the surface of the steel plate within a range of 0° to −15° sweep-back angle;

arranging a tip of a wire of a second electrode located at a second position behind the first position in the weld line, and moving the second electrode behind the first electrode in the welding direction along the weld line, the wire of the second electrode having an angle 5° or more and 20° or less with respect to the vertical line;

arranging a tip of a wire of a third electrode on the surface of the steel plate at a tail-end third position behind the second position along the weld line with the third electrode being located over the first area, the third position being located on the first area at a first offset distance ($W_r$) of 5 to 20 mm from a moving reference point on the weld line, and moving the tip of the wire of the third electrode behind the second electrode in the welding direction along the weld line of the steel plate while keeping the third electrode located over the first area and the tip of the wire of the third electrode at the first offset distance ($W_r$) of 5 to 20 mm from the reference point on the weld line, the wire of the third electrode having an angle 20° or more and 50° or less with respect to the vertical line; and arranging a tip (42) of a wire of a fourth electrode adjacent the surface of the steel plate at a tail-end fourth position behind the second position along the weld line with the fourth electrode being located over the second area, the fourth position being located on the second area at a second offset distance ($W_l$) of 5 to 20 mm from the moving reference point on the weld line, and moving the tip of the wire of the fourth electrode behind the second electrode in the welding direction along the weld line of the steel plate while keeping the fourth electrode located over the second area and the tip of the wire of the fourth electrode at the second offset distance ($W_l$) of 5 to 20 mm from the reference point on the weld line, the wire of the fourth electrode having an angle 20° or more and 50° or less with respect to the vertical line, wherein the third and fourth electrodes are moved such that the third position, the reference point on the weld line, and the fourth position define a straight line during said moving, wherein, in the submerged arc welding using the four or more electrodes, during said moving the tips of the third and fourth electrodes in the welding direction along the weld line, the third and fourth electrodes are inclined with respect to the surface of the steel plate and in a direction opposite the welding direction and away from the weld line, such that distances ($M_r$, $M_l$) between i) the weld line and ii) a position of intersection of the surface of the steel plate and a line drawn directly downward from a tip center of a contact tip of each of the third and fourth electrodes respectively satisfy the distances ($M_r$, $M_l$) being greater than or equal to the first and second offset distances ($W_r$, $W_l$) such that $M_r \geq W_r$ and $M_l \geq W_l$ thereby preventing separation of penetrations of the tail-end two electrodes and generation of undercut in enlarging a bead width of the welding, and wherein the steel plate is welded at a weld speed of 3 m/min or less.

2. The submerged arc welding method according to claim 1, wherein, during said moving the tips of the third and fourth electrodes in the welding direction along the weld line, the third and fourth electrodes are inclined with respect to the surface of the steel plate and in the direction opposite the welding direction and away from the weld line, such that each of the third and fourth electrodes respectively satisfies the distances ($M_r$, $M_l$) being greater than the first and second offset distances ($W_r$, $W_l$) such that $M_r > W_r$ and $M_l > W_l$.

3. The submerged arc welding method according to claim 1, wherein an alternating current is supplied to the third and fourth electrodes.

4. The submerged arc welding method according to claim 2, wherein an alternating current is supplied to the third and fourth electrodes.

* * * * *

UNITED STATES PATENT AND TRADEMARK OFFICE
CERTIFICATE OF CORRECTION

PATENT NO. : 9,764,410 B2
APPLICATION NO. : 14/360794
DATED : September 19, 2017
INVENTOR(S) : Atsushi Ishigam et al.

It is certified that error appears in the above-identified patent and that said Letters Patent is hereby corrected as shown below:

At Column 9, Line 27, in Claim 1, "arranging a tip (42)" should read --arranging a tip--.

Signed and Sealed this
Thirty-first Day of October, 2017

Joseph Matal
*Performing the Functions and Duties of the
Under Secretary of Commerce for Intellectual Property and
Director of the United States Patent and Trademark Office*